INVENTOR.
GEORGE W. COOK

June 16, 1964 G. W. COOK 3,137,814
PHASE AND AMPLITUDE SENSITIVE DISCRIMINATOR
INCLUDING CAPACITIVE IMPEDANCES
Original Filed Oct. 7, 1959 9 Sheets-Sheet 3

INVENTOR.
GEORGE W. COOK
BY
Curtis, Morris & Safford
ATTORNEYS

FIG. 5

INVENTOR.
GEORGE W. COOK
BY
Curtis, Morris & Safford
ATTORNEYS $$r_e = \frac{1}{\omega^2 C_1{}^2 r_p}$$
$$e' = \frac{e}{j\omega C_1 r_p + 1}$$

$$L_{ea} = L_1 - \frac{M_1{}^2}{2L_1}$$
$$M_{ea} = \frac{M_1{}^2}{2L_1}$$

INVENTOR.
GEORGE W. COOK

BY
Curtis, Morris & Safford
ATTORNEYS $$L_2 = \frac{L_1}{4}$$

$$L_{eb} = L_2 - \frac{M_2^2}{2L_2} \qquad M_{eb} = \frac{M_2^2}{2L_2}$$

INVENTOR.
GEORGE W. COOK
BY
Curtis, Morris & Safford
ATTORNEYS

INVENTOR.
GEORGE W. COOK

INVENTOR.
GEORGE W. COOK
BY
Curtis, Morris & Safford
ATTORNEYS

United States Patent Office 3,137,814
Patented June 16, 1964

3,137,814
PHASE AND AMPLITUDE SENSITIVE DIS-
CRIMINATOR INCLUDING CAPACITIVE
IMPEDANCES
George W. Cook, Washington, D.C., assignor to Thiokol
Chemical Corporation, Bristol, Pa., a corporation of
Delaware
Original application Oct. 7, 1959, Ser. No. 844,993. Divided and this application Jan. 12, 1962, Ser. No. 169,990
6 Claims. (Cl. 324—87)

The present invention relates to a measurement system including a resonant bridge and associated equipment for providing accurate measurement of various conditions or phenomena. In particular, the measurement system of the present invention provides accurate quantitative measurement of small changes in electrical capacitance for measuring various conditions or phenomena such as force, displacement, pressure, velocity, torque, temperature and the like. The system is quick and sensitive in its response to changes in capacitance and conveniently provides an output voltage which varies linearly with changes in the condition under observation.

This application is a division of Serial No. 844,993, filed October 7, 1959.

The resonant bridge circuit includes two arms formed by a pair of capacitors which differentially vary in accordance with the condition or phenomenon under observation. The other two arms of the bridge are formed by electrical impedances which are not physically present within the bridge circuit but which are reflected into the bridge circuit from other portions of the system outside of the bridge circuit. In other words, two arms of the bridge circuit are "phantom arms" which are not physically present but which are electrically present in the circuit and are in operation, providing advantageous results.

In the illustrative embodiment of the present invention described herein, there is provided an improved phase and amplitude-sensitive discriminator coupled to the output of the bridge circuit. This discriminator includes four half-wave voltage doublers which advantageously provide a reference to the common return or "ground" every half cycle and thus avoid any tendency for the output voltage to drift. Moreover, this discriminator is resonant with both the signal input circuit and the reference input circuit, and thus the only energization required for the discriminator is that small amount which is necessary to sustain oscillation therein.

In prior practice, measuring systems have been devised utilizing electrical capacitors as sensitive elements, but prior systems have suffered from the disadvantages of one or more of the following arrangements:

(1) The distributed capacitance of the cable extending from the sensitive capacitor element to the indicating circuit was connected in parallel with the sensing capacitance. In this arrangement the sensitivity was reduced and changes in cable capacitance introduced spurious signals and indications which were relatively large and which masked the true measurements intended to be made.

(2) The sensitive capacitor element was coupled to an oscillating circuit and the indication was obtained by detecting either an amplitude modulation or a frequency modulation in the oscillating circuit. This arrangement suffered from the disadvantage that the frequency of the oscillating circuit must be changeable or variable, and thus the frequency tended to be changed by spurious effects, and the frequency often tended to drift. The difficulty was most pronounced when an attempt was made to measure very slow changes in the capacitor element.

(3) The sensitive capacitance element formed a part of a bridge circuit in which one arm was extended electrically to a remote location and reactance was reflected back to the bridge circuit by changes in a remotely located tuned circuit. With this arrangement the system was inherently non-linear and, to some extent was unstable, because the system must of necessity operate on one side of a resonance curve, wherein strictly speaking there is no truly linear slope.

In a system embodying the present invention the bridge circuit is formed by two sensitive capacitance elements and by two "phantom arms" and thus advantageously avoids the problems discussed above. This measurement system includes the least possible number of circuit components physically present in the bridge circuit and thus limits the sources of measurement errors. Moreover, the system rapidly responds to very slight changes in capacitance and produces an output voltage which is a faithful reproduction of the capacitance changes.

Among the many advantages of measurement systems embodying the present invention are their ability to measure minute changes in capacitance to a high degree of accuracy and their high degree of stability in operation. As a result of this marked stability there is no significant output signal produced, except when there is a change in the balance of the bridge due to a change in the condition being observed. Moreover, the system provides a linear, accurate response over a wide range of frequencies, in this example extending from zero cycles per second up to twenty thousand cycles per second.

Among the other advantages of measurement systems embodying the present invention are those resulting from the fact that they are convenient to calibrate, ruggedly resisting ambient conditions, and are adapted for use in a wide variety of installations.

Other features and objects of the present invention and the many attendant advantages provided by use of the invention will be appreciated as the same becomes more fully understood from a reference to the example of a measurement system described herein as embodying the present invention and illustrated in the accompanying drawings, in which:

FIGURE 5 is a simplified schematic circuit diagram of portions of the system of FIGURES 1 and 2 for purposes of illustration and explanation;

Figure 1:
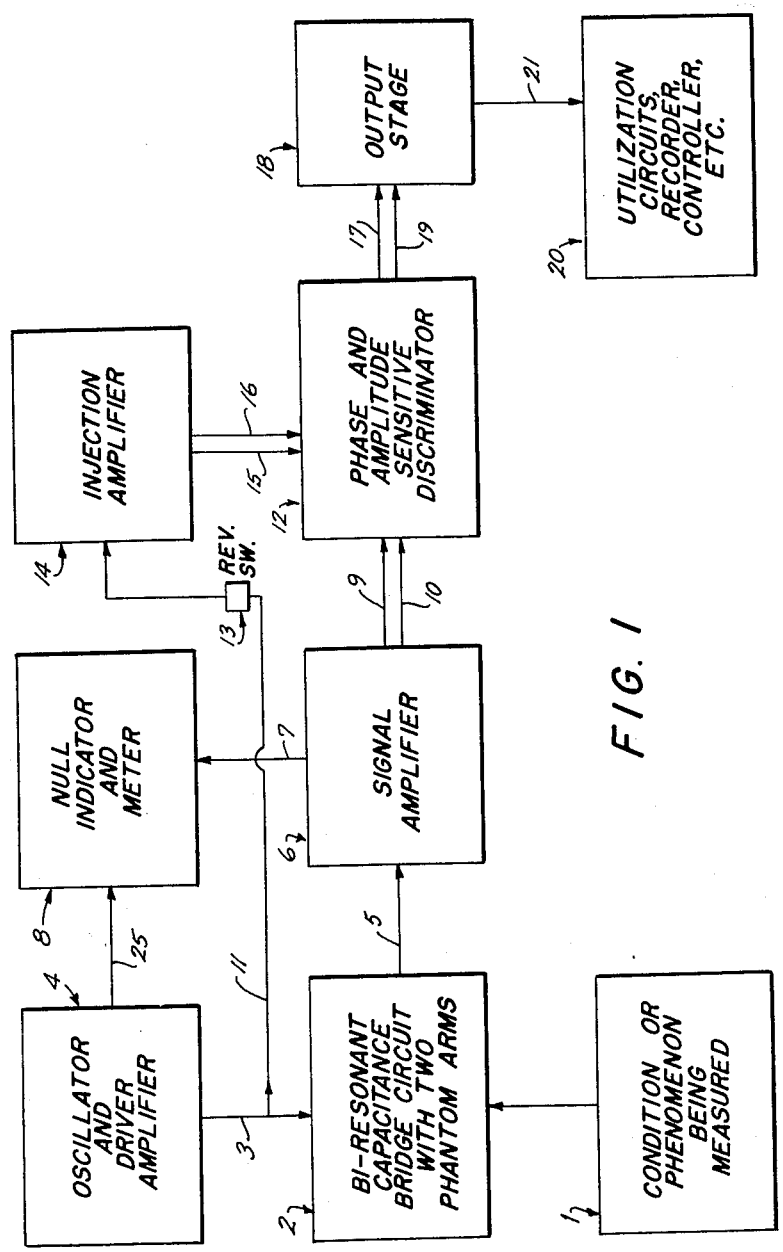
FIGURE 1 is a functional schematic block diagram of a measurement system embodying the present system.
Figure 2:
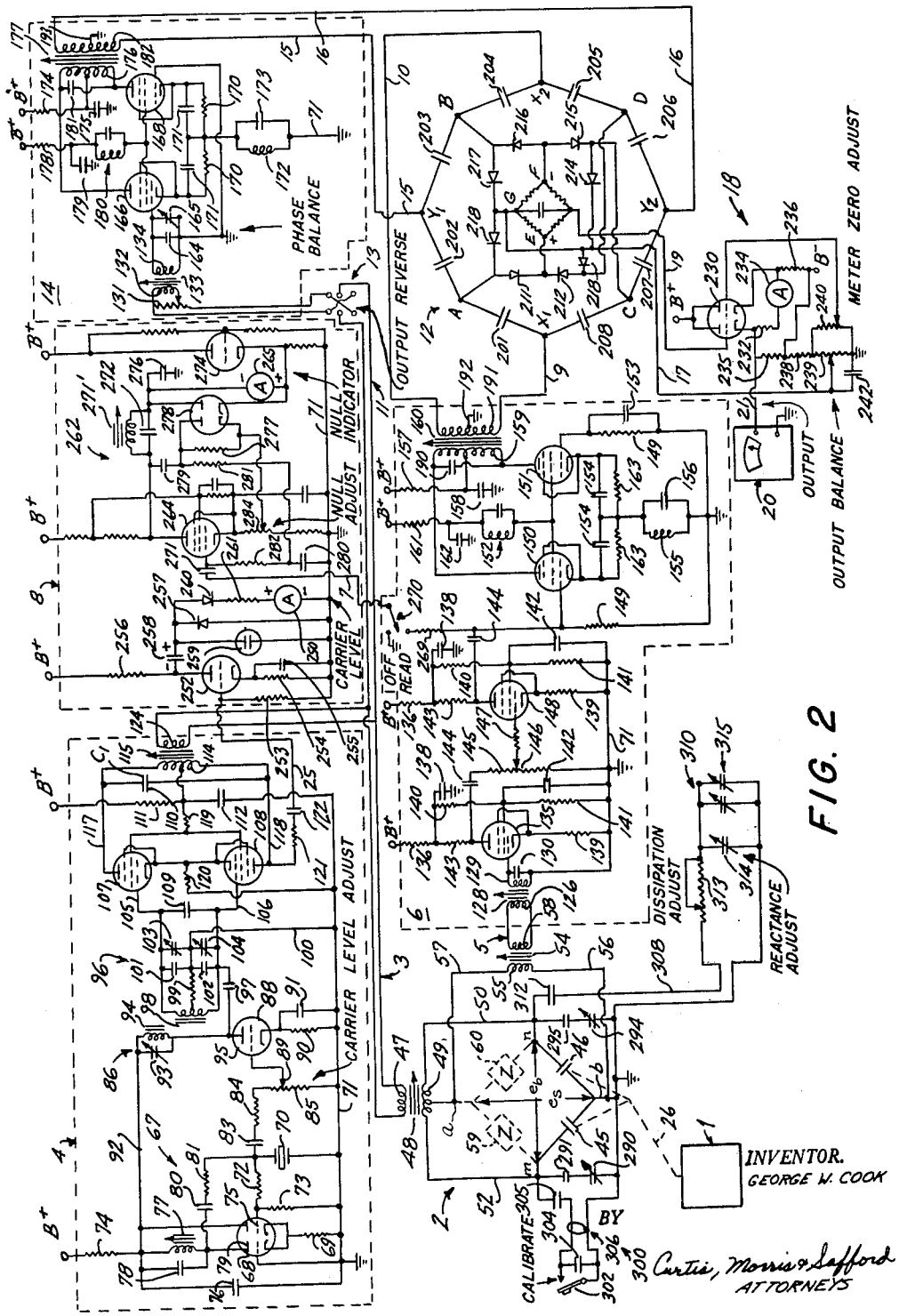
FIGURE 2 is a schematic circuit diagram of this measurement system of FIGURE 1.
Figure 6A:
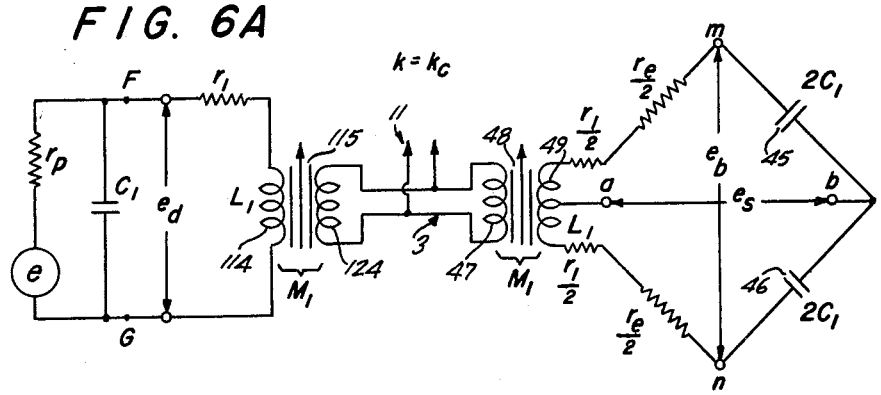
Figure 6B:
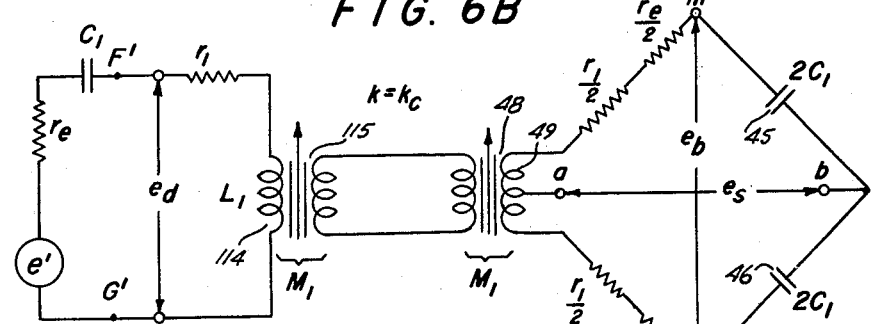
Figure 6C:
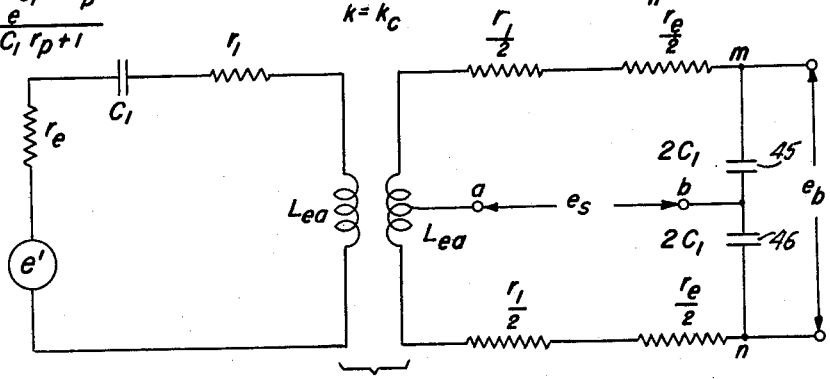
Figure 7A:
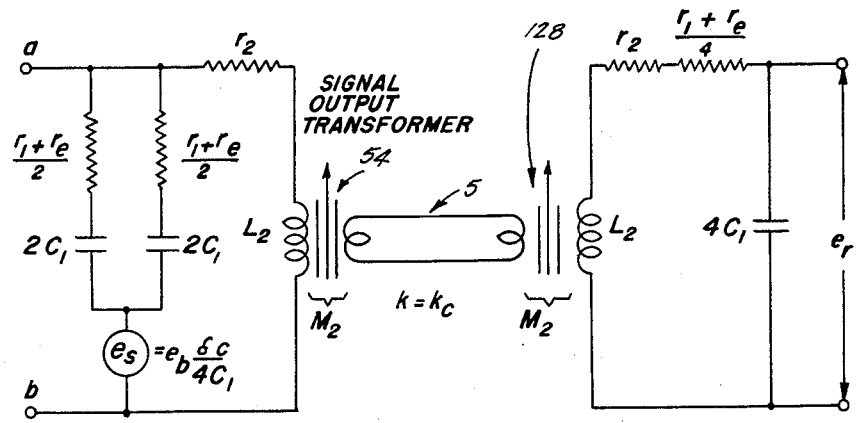
Figure 7B:
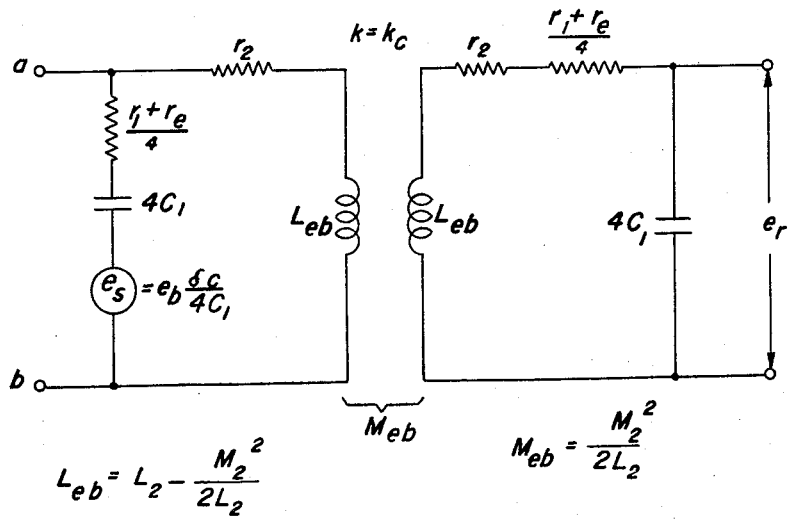
Figure 8:
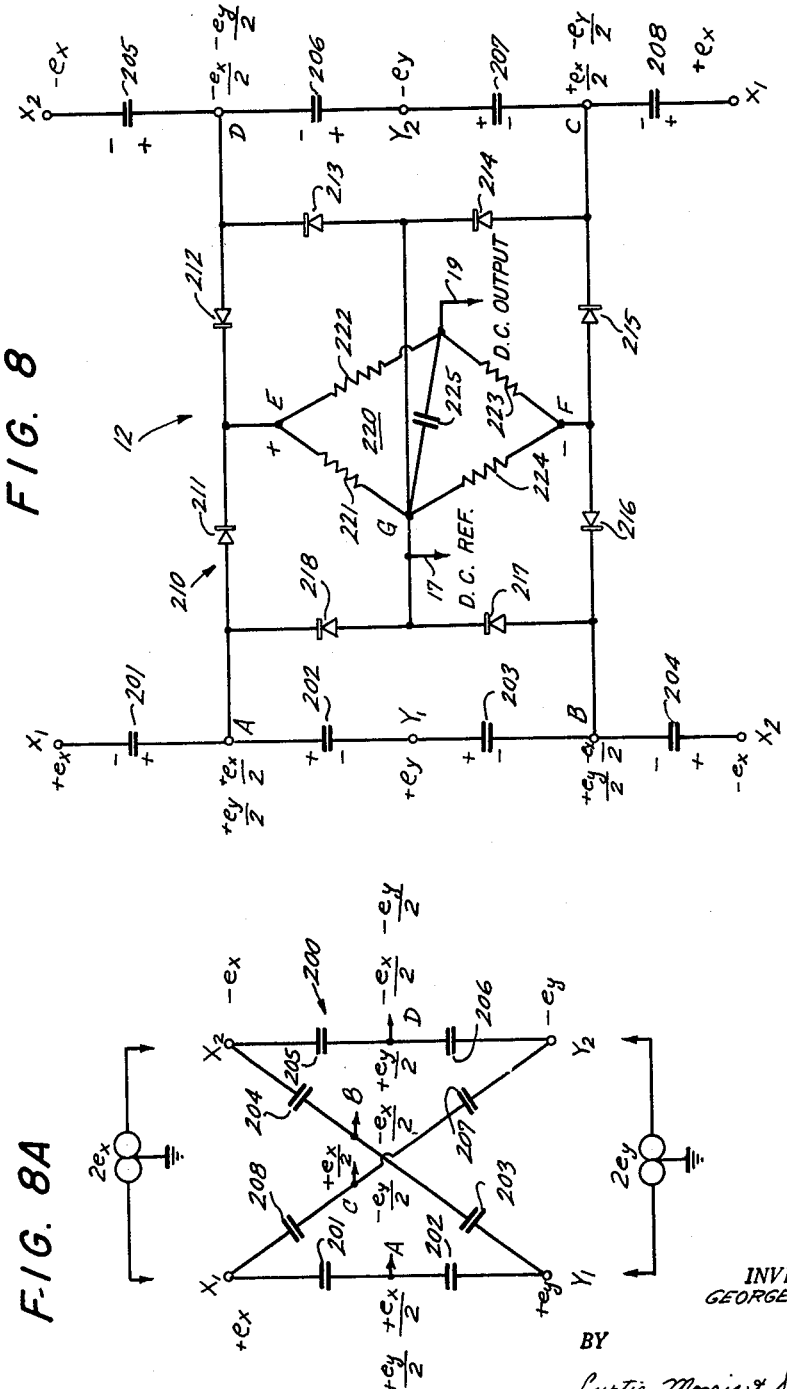
Figure 8A:
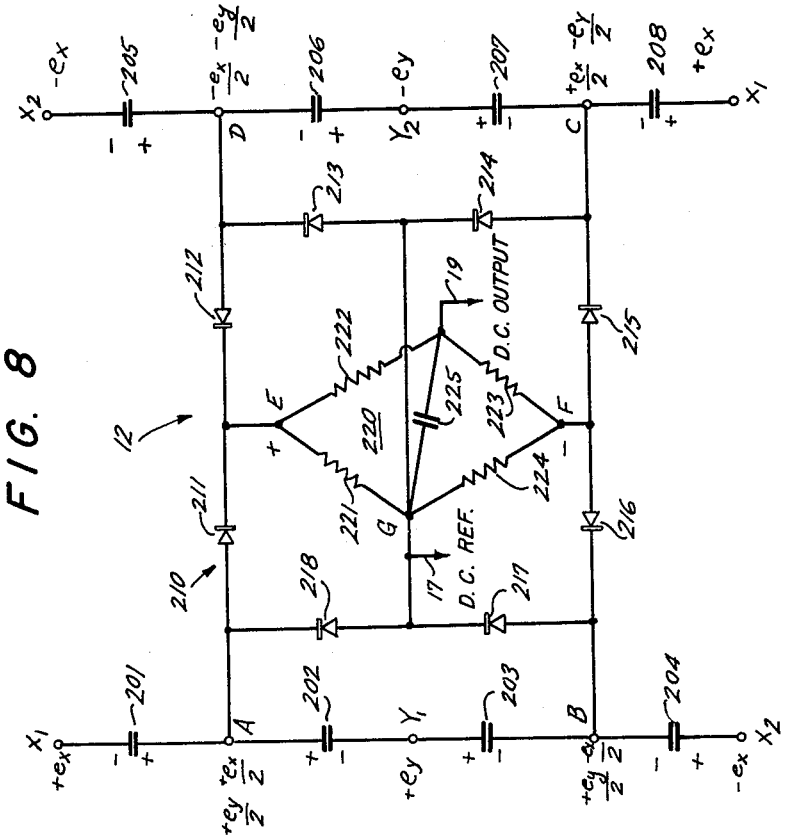
Figure 10:
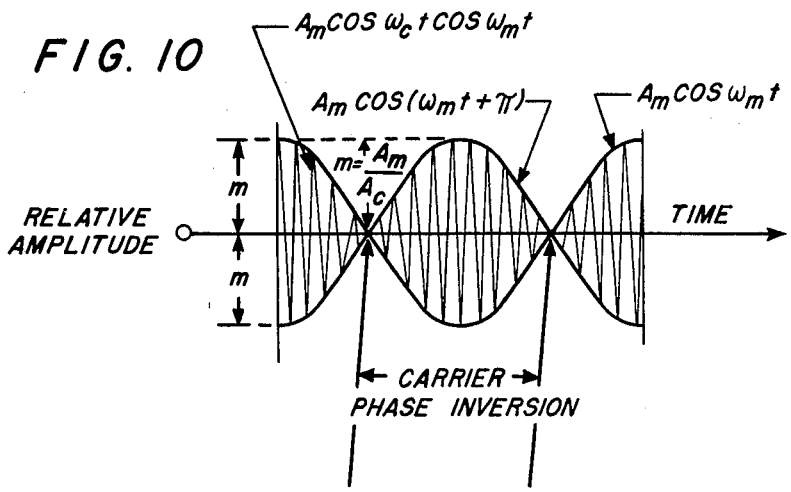

FIGURES 6A, 6B, and 6C are simplified schematic circuit diagrams of the driver circuit, bridge circuit, and signal circuits for purposes of explanation;

FIGURES 7A and 7B are further explanatory circuit diagrams showing the results of a small differential change in the two capacitance arms of the bridge;

FIGURE 8 is an enlarged schematic circuit diagram of the phase and amplitude sensitive discriminator of FIGURES 1 and 2;

FIGURE 8A shows the capacitance loop circuit of this discriminator;

FIGURES 9A, 9B, 9C, and 9D are simplified schematic circuit diagrams of the equivalent coupled circuits for the phase and amplitude sensitive discriminator;

FIGURE 10 shows the waveform of the voltage $e_r$ of FIGURES 7A and 7B; and

Figure 11:
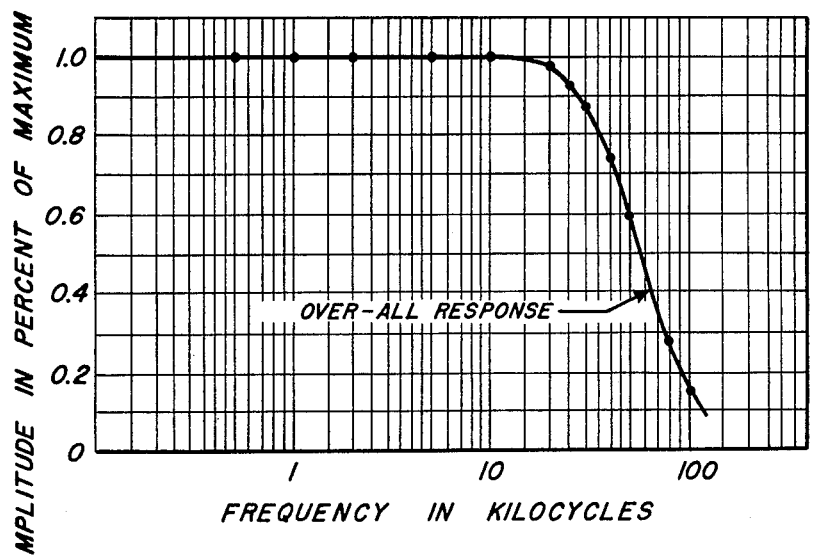

FIGURE 11 is a plot showing the over-all frequency response curve for the measurement system up to the output terminal 21.

This system of the present invention has many advantages over the four-capacitance bridge circuit shown in U.S. Patent No. 2,611,021, issued September 16, 1952, as will appear from the following illustrative example. This present system enables a more convenient and rapid adjustment into initial balance, and is markedly more stable in operation. Moreover, this present system is considerably less complex while being more sensitive and linear in output.

*General Description of the System and the Operation*

As shown in FIGURE 1, the measurement system of the present invention includes a bi-resonant bridge 2 having two capacitance arms and two phantom arms. That is, two arms of the bridge are not physically present within the bridge circuit but they are electrically present within the bridge circuit, being reflected into the bridge circuit from other portions of the measurement system. The bridge 2 is energized by a suitable alternating current carrier signal of fixed frequency. For example, in this system the carrier signal has a low radio frequency of 456 kilocycles. This carrier signal is transmitted to the bridge circuit by means of a low-impedance transmission line schematically illustrated at 3 from a crystal-controlled oscillator and driver amplifier circuit 4.

The bridge circuit 2 is initially balanced, and resonance at the carrier frequency is induced in two modes. In response to the condition or phenomenon being measured, generally indicated at 1, the two capacitance arms are changed differentially, and an unbalance signal voltage is developed at the two output terminals of the bridge. This unbalance signal voltage is transmitted by means of another low-impedance transmission line 5 to a signal amplifier 6. As indicated by a connection 7, the amplified unbalance signal voltage is fed into null indicator and meter circuits 8 which provide a visual indication to the operator of the state of balance or unbalance in the bridge circuit. The amplified unbalance signal is also fed through a pair of connections 9 and 10 from the signal amplifier to a phase and amplitude sensitive discriminator 12. In order to provide a reference signal for the discriminator 12, the carrier signal is supplied through a transmission line 11 and an output reversing switch 13 to an injection amplifier 14 and is amplified and fed through connections illustrated at 15 and 16 to the discriminator 12.

In this discriminator 12 the amplified unbalance voltage from the bridge is compared with the amplified carrier signal. By means of phase comparison, the sense or direction of the unbalance of the bridge circuit is determined. The amplitude of the unbalance voltage is sensed; the carrier signal and sideband components are removed by rectification; the current in one-half of the discriminator is subtracted from the current in the other half; and a direct-current difference voltage of the proper amplitude and polarity to indicate accurately the condition or phenomenon 1 is supplied through leads 17 and 19 to an output stage 18. From the output stage, the output voltage is then sent through a lead 21 to the desired utilization circuits 20, which may include various instruments such as recorders, controllers, meters, etc., which suitably utilize the information obtained concerning the observed condition 1. In order to indicate the amplitude of the carrier signal, there is a connection 25 from the oscillator and driver amplifier to the meter circuits 8.

*Transducers Incorporating Bridge Circuit*

Figure 3:
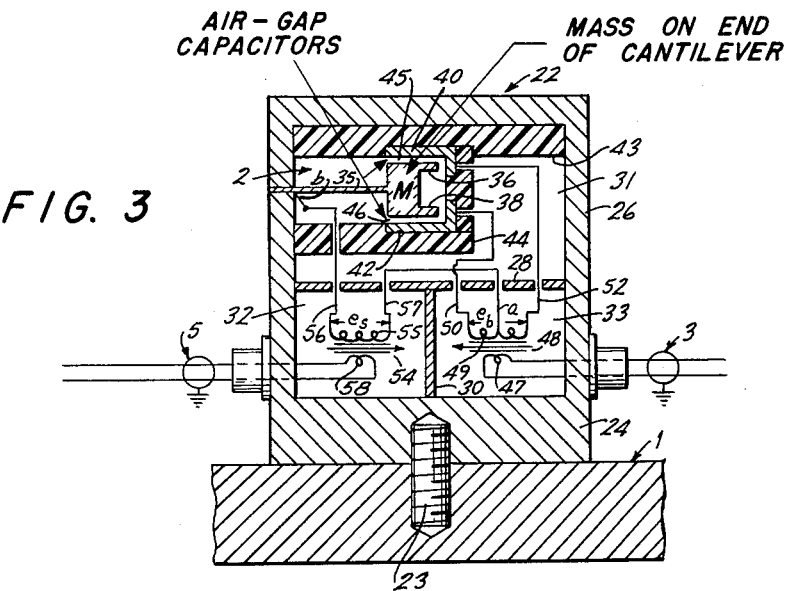
FIGURE 3 is an elevational sectional view of a transducer in the form of a rectilinear accelerometer, with the bridge circuit being incorporated.
Figure 4:
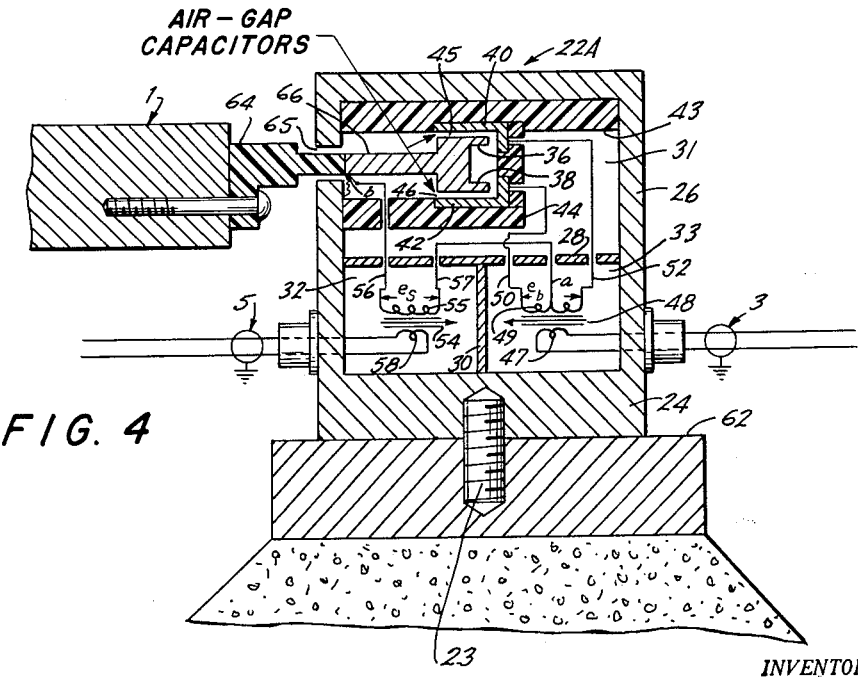
FIGURE 4 is an elevational sectional view of another transducer for measuring slight deflections of various structures under load.

Before considering in detail the operation and construction of the system of FIGURES 1 and 2 it may be helpful to direct attention to FIGURE 3 which shows a suitable transducer in the form of a rectilinear accelerometer with the bridge circuit of the system built into the transducer, and to FIGURE 4 which shows another transducer suitable for measuring small displacements in which the bridge circuit is also incorporated. As shown in FIGURE 3, the rectilinear acceleration transducer 22 is sensing the acceleration of the structural member 1 of a vehicle. This transducer is mounted rigidly onto the structure 1 by a mounting stud 23 screwed into the base 24 of a housing 26 formed of rigid material, for example stainless steel. Within the housing are a rigid partition 28 and a separator 30, each of electrically conducting material, such as hard brass, forming three electrically shielded compartments 31, 32, and 33. In the upper or sensing compartment 31 is a compliant cantilever 35 of electrically conducting material, such as beryllium copper, which projects inwardly from the housing 26 and supports a mass M at its free end having a pair of capacitor plates 36 and 38 formed on its opposite sides. Adjacent to either side of the mass M are two capacitor plates 40 and 42, spaced uniformly from the plates 36 and 38, respectively, and mounted upon rigid insulation supports 43 and 44, thus forming a pair of differential air-gap capacitors 45 and 46.

In order to energize the capacitors 45 and 46, a low-impedance transmission line 3, shown as a shielded link coupling, is connected to the primary winding 47 of a bridge transformer 48 having a center-tapped secondary winding 49. A pair of leads 50 and 52 extend from opposite sides of the secondary 49 through small openings in the partition 28 to the two fixed plates 40 and 42, respectively. An alternating voltage $e_b$ is applied across the leads 50 and 52 and forms the bridge-driving voltage. The bridge transformer 48 is constructed with an adjustable powdered iron core as indicated by the adjustable symbol and enables a fine adjustment to be made to assure that the center tap has a voltage which is exactly centered between the signal on the leads 50 and 52. As a result of the differential change in the capacitance of the capacitors 45 and 46, this system produces an output voltage in the lead 21 to the utilization circuits 20 which accurately and linearly indicates the magnitude and direction of the acceleration.

When acceleration occurs in an axial plane of the mounting stud, then the mass M moves closer to one of the fixed plates 40 or 42 and farther from the other, causing a differential change in the capacitances of the air-gap capacitors 45 and 46. In order to sense the slight changes in the capacitances, a signal transformer 54 has its primary winding 55 connected by a lead 56 to the point "b" at the fixed end of the cantilever 35 and by a lead 57 to the point "a" at the center tap of the secondary 49. The secondary 58 of the signal transformer is connected to a low impedance transmission line 5, illustrated as a shielded link coupling. For obtaining to the fullest the advantages that can be provided by this system, it is important that good shielding be maintained between the driver and signal transformers 48 and 54. This shielding should prevent both stray electromagnetic as well as stray electrostatic coupling, and is provided by the relatively thick conductive partition 28 and divider 30, which are quite effective in blocking the low radio frequency signal. At lower frequencies magnetically permeable shields may be used in addition to the conductive shields.

It will be noted that the transducer 22 incorporates the bridge circuit 2, which includes the two capacitance arms 45 and 46 and also the two phantom arms 59 and 60 (please see also FIGURE 2). The fixed end of the cantilever 35 is secured to the housing 26, and this constitutes a common return ("ground") connection for the lead 56. In order to assure that the various elements remain in fixed positions within the three compartments 31, 32 and 33, they are filled after adjustment of the transformers 48 and 54 with a rigidly setting insulating plastic material or potting compound, for example an epoxy resin.

The displacement-sensing transducer 22A of FIGURE 4 is generally quite similar to the transducer 22, and parts performing corresponding functions have corresponding reference numbers. In operation this transducer is used to measure very small deflections of structural members under load, for example, to measure the deflection of steel beam 1 under stress. The base 24 is anchored by the mounting stud 23 to a fixed support 62. To sense the deflection of the structure 1, such as a pavement strip, a rigid cantilever 64 of insulation material projects from the structure 1 through a window 65 in the housing 26 and connects to the end of a stiff conductive cantilever 66 which includes the capacitive electrodes 36 and 38. The lead 56 is connected to the outer end of the conductive cantilever 66, and a flexible ground connection extends from this cantilever to the housing 26. As the member 1 deflects very slightly under heavy load, the movement causes the capacitance of one of the air-gap capacitors 45 or 46 to increase while the other decreases. As a result, the utilization circuit 20 is supplied a voltage which corresponds with the magnitude and direction of the deflection.

Oscillator and Driver Amplifier

A system which has proven to be very sensitive and accurate in operation is shown in FIGURE 2. The oscillator and driver amplifier circuit is generally indicated within the dashed rectangle 4 and includes an oscillator stage 67 utilizing a dual triode 68 having both sections of the tube coupled through a common cathode resistor 69. A crystal 70 which is resonant at 456 kilocycles is connected to the common return ("ground") circuit 71 and is connected through a resistor 72 and across a grid-return resistor 73 to the grid of one section of the dual triode. The anode is supplied from a suitable voltage supply source B+ through a filter resistor 74 and is effectively tied to the ground 71 through a filter capacitor 76. This oscillator 67 is the so-called "Boot Strap" oscillator and is characterized by an extremely stable output frequency. This oscillator was described in detail by applicant in the January 1953 issue of "Electronics," but its features are described briefly here for convenience. The crystal 70 serves a dual purpose. It serves as an extremely sharp filter, thus providing excellent waveform at the output coupling capacitor 83. Also, it is the frequency-determining circuit element for the oscillator. The oscillator is self-starting when the anode supply voltage is turned on.

There is no phase reversal in the two sections of the dual triode. The voltage across the crystal is fed to the grid 75 of the right triode section, which operates as a cathode-follower and drives the left triode section by means of the coupling through the common cathode resistor 69. The voltage of the anode 79 thus changes in the same direction as the grid 75, developing a signal across the plate load including the inductor 77 shunted by the capacitor 78. This plate signal is fed back to the crystal 70 and to the grid 75 through a positive feedback circuit including a coupling capacitor 80 and a resistor 81.

The purpose of the inductor 77 and capacitor 78 is to offset the distributed plate capacitance and transit time of the left triode section so as to make the positive feedback voltage directly in phase with the voltage across the crystal 70. In this example it is found to be advantageous to have the resonant frequency of the parallel circuit including the inductor 77 and capacitor 78 detuned just slightly to offset the transit time, being resonant at a frequency slightly below the oscillator frequency. Thus, the plate circuit 77, 78 provides a leading phase angle which advances the phase of the voltage of the anode 79 and compensates for any delay in the left triode due to transit time and distributed plate capacitance.

It will be understood that the voltage supply source B+ is a typical power supply, which in this example, supplies a positive direct current voltage at the terminals B+ of 300 volts with respect to the common return or ground connection 71. This power supply also has a terminal B−, which is seen at the lower right in FIGURE 2 and supplies a negative D.-C. voltage of minus 150 volts with respect to the common ground connection.

From this oscillator stage 67 the carrier signal is coupled through a capacitor 83 and a resistor 84 to a potentiometer 85 which is used for adjusting the amplitude, i.e. level, of the carrier signal which is then amplified by the tuned push-pull amplifier 86. In the input of this amplifier is a triode 88 with its grid connected to the adjustable contact 89 of the potentiometer and having a cathode-bias resistor 90 with a by-pass capacitor 91. Anode voltage is supplied to this triode through a lead 92 and a tuned plate load including an adjustable capacitor 93 and an inductor 94. The tube 88 drives a tuned push-pull grid circuit 96 which acts as an accurate phase splitter and avoids reflecting any Miller effect from the triode 88 into the oscillator stage.

From the anode 95 the carrier signal is coupled through a capacitor 97 to a tuned push-pull grid circuit including an inductor 98 having a center tap connected through a resistor 99 and a lead 100 to the common ground. A pair of fixed capacitors 101 and 102 shunted by small adjustable capacitors 103 and 104, respectively, are connected from the lead 100 to a pair of grid leads 105 and 106 which are connected to opposite sides of the inductor 98 and control the push-pull pentodes 107 and 108. A capacitor 109 is shunted between these leads 105 and 106. Anode potential for these tubes is supplied from B+ through a filter resistor 111 and over a filter capacitor 112 to a center tap in the primary winding 114 of a driver transformer 115 having an adjustable powdered iron core. The opposite sides of the primary are connected through leads 117 and 118 to the respective anodes of the tubes 107 and 108. A resistor 119 supplies screen-grid potential from the center tap to the screen grids, and a common cathode resistor 120 provides the operating bias for the grids. For providing an indication of carrier level, a resistor 121 and capacitor 122 are connected in series from the anode lead 118 to the connection 25 which runs into the meter circuits 8, as will be described in detail further below.

To energize the bridge circuit 2, the secondary winding 124 of the driver transformer 115 is connected by a shielded low impedance transmission line 3 to the primary 47 of the bridge transformer 48. It is preferred, for the most sensitive and accurate response, that an exact electrical symmetry be established in the opposite halves of the primary of the driver transformer 115 and in the opposite halves of the secondary of the bridge transformer 48. Also, the primary winding 114 and the secondary winding 49 are resonant at the frequency of operation with the capacitance associated therewith, as will be explained. The primary winding 114 is resonant with a capacitance $C_1$ thereacross, which includes the stray plate capacitance of the tubes. Although the driver amplifier is shown as being push-pull, for the practical reason that this reduces distortion, the driver amplifier may be single-ended, and the primary 114 may be unsymmetrical; however, the system as shown provides very sensitive precise measurements.

Further Description of the System and Features of Operation

In order to explain the operation of the system which is shown in FIGURES 1 and 2, attention is directed to the schematic circuit diagram of FIGURE 5, which illustrates in simplified form portions of this system. The push-pull pentodes 107 and 108 develop a driving voltage $e_d$ between the leads 117 and 118 and across the primary winding 114 which has a self-inductance $L_1$. The capacitance $C_1$ and the inductance $L_1$ are resonant at the frequency of operation. Also, there is a mutual inductance $M_1$ between the primary 114 and the secondary 124.

The bridge transformer 48 is identical to the driver transformer 115, except that the respective positions of the primary and secondary are reversed. Its secondary has a self-inductance of $L_1$ and there is a mutual inductance of $M_1$ between its primary and secondary. In operation, the two capacitors 45 and 46 are equal and are in series across the secondary winding 49 and are resonant with the inductance $L_1$ of the winding 49. Thus, each of these capacitors normally has a capacitance value of $2C_1$.

As discussed above, the bridge transformer is adjusted so that the point "$a$" is an exact electrical center point with respect to the leads 50 and 52, and normally the two capacitors 45 and 46 are equal. Thus, regardless of the magnitude of the bridge voltage $e_b$, appearing between the points $m$ and $n$, the signal voltage $e_s$ appearing between the points "$a$" and "$b$," when the bridge is balanced, is zero. As a consequence, the resonance of the secondary 49 with the two capacitors 45 and 46 is not in any way affected by the presence or absence of the connections 56 and 57 to the primary 55 of the signal transformer. Thus, the operation of the bridge circuit 2 is extremely stable, because it is not significantly influenced by the operation of the signal output circuit.

FIGURE 2 shows the actual physical arrangement of the leads 50 and 52 which are connected from opposite sides of the secondary 49 to the opposite corners $m$ and $n$ of the bridge. However, as indicated by the dashed lines in FIGURE 2, the bridge circuit operatively includes the impedances 59 and 60 each shown by the symbol Z, which are reflected into the bridge circuit from the primary side of the bridge exciting transformer 48. Consequently, as is illustrated in FIGURE 5, the bridge circuit operates as if the phantom arms 59 and 60 were connected between the center tap of the secondary 49 and the bridge points $m$ and $n$.

As seen in FIGURE 5, the two capacitors 45 and 46 are effectively connected by the respective phantom arms 59 and 60 in parallel with one another between the points "$a$" and "$b$." Under these conditions, with the capacitors 45 and 46 resonant with the secondary 49 and with no voltage between the points "$a$" and "$b$," then the signal circuit can be effectively resonant with the capacitors 45 and 46 even though there is no voltage developed across it and no current in it. To provide this resonance, the primary 55 of the signal transformer has an inductance value $L_2$ which will resonate with a capacitance value of $4C_1$, which is formed by $2C_1$ in parallel with $2C_1$. In other words, $L_2$ is one-quarter of $L_1$ in value.

As shown in FIGURE 5, the secondary of the signal transformer is connected to the primary 126 of a receiver transformer 128, which is identical with the signal transformer except that the relative positions of primary and secondary are reversed. The secondary 129 of the receiver transformer has the inductance value of $L_2$, which resonates at the carrier frequency with a parallel capacitor 130 of value $C_2$, equal to $4C_1$. In the signal amplifier 6, the output voltage $e_r$ from the receiver transformer is amplified and fed as a balanced push-pull signal into the $X_1$ and $X_2$ terminals of the phase and amplitude sensitive discriminator 12.

To supply a reference signal to this discriminator, the carrier signal is fed from the secondary of the driver transformer over a low impedance line 11. This reference signal passes through a reversing switch 13 into a high resistance potentiometer 131 which is across the primary 132 of a transformer 133. Its secondary 134 forms the input of a balanced injection amplifier 14, which provides a balanced push-pull carrier signal to the $Y_1$ and $Y_2$ terminals of the discriminator 12. The operating advantages of the phase and amplitude sensitive discriminator are explained in detail further below.

Referring to the schematic circuit diagram of FIGURE 6A, the driver amplifier tubes 107 and 108 are most easily schematically illustrated by an equivalent single-ended amplifier, this being shown symbolically as a generator with zero internal impedance delivering a signal voltage $e$ and having a resistor $r_p$ in series therewith, representing the effective dynamic plate resistance of the driver amplifier. It will be understood that in FIGURE 6A for convenience of illustration the link coupling line 11 and injection amplifier connected to the line 3 are only briefly indicated.

In order to obtain best results, the effective dynamic plate resistance $r_p$ of this amplifier should be quite high, preferably at least 1 megohm. The reason for this is that the "Q" for the circuits should not go much below 8 or 10 in order to obtain the best response, and this Q is determined by the value of $r_p$. There is no particular advantage in seeking a Q value above 20, and a Q value of 4 or lower causes poor operation. The impedances Z at 59 and 60 comprising the phantom arms each include the resistances $$\frac{r_1}{2}$$

and $r_e$.

The resistor $r_1$ represents the dissipation resistance that is inherent in the primary 114, and the two resistors $$\frac{r_1}{2}$$

represent the dissipation resistance of the two halves of the secondary winding 49. The two resistors $$\frac{r_e}{2}$$

are the effective resistances included in the impedances Z of the two phantom arms 59 and 60, resulting from the dynamic plate resistance $r_p$ of the amplifier reflected into the bridge.

FIGURE 6B is a schematic diagram of a circuit arrangement which is precisely equivalent to the circuit of FIGURE 6A, and wherein the capacitor $C_1$ is in series with an equivalent signal voltage $e'$. In order to show that this is true, it is noted that if the circuit of FIGURE 6A is cut open at the two points F and G, the open-circuit voltage $e_0$ presented is:

(1) $$e_0 = e \frac{\frac{1}{j\omega C_1}}{r_p + \frac{1}{j\omega C_1}} = \frac{e}{j\omega C_1 r_p + 1} = e'$$

If the circuit of FIGURE 6B were cut open at the points F' and G', the equivalent open-circuit voltage $e'$ would appear.

The open-circuit impedance looking toward the left from points F and G in FIGURE 6A is:

(2) $$Z_0 = \frac{\frac{r_p}{j\omega C_1}}{\frac{1}{j\omega C_1} + r_p} = \frac{r_p}{j\omega C_1 r_p + 1}$$

This should be equal to the open-circuit impedance looking toward the left from the points F' and G' in FIGURE 6B, which is:

(3) $$Z_0 = r_e + \frac{1}{j\omega C_1} = \frac{r_p}{j\omega C_1 r_p + 1}$$

Thus, (4) $$r_e = \frac{r_p}{j\omega C_1 r_p + 1} - \frac{1}{j\omega C_1} = \frac{1}{\omega^2 C_1^2 r_p - j\omega C_1}$$

In view of the fact that the second term in the denominator of the right expression is so very small compared with the first term, this can be simplified, as stated, to:

(5) $$r_e = \frac{1}{\omega^2 C_1^2 r_p}$$

The circuit of FIGURE 6B can be further simplified to another precisely equivalent form, assuming that the losses in the link coupling circuit are very small, which is the case here. This conversion for link-coupled circuits is shown in Radio Engineer's Handbook by F. E. Terman, First Edition, Fourth Impression (1943) on page 162, and is shown in FIGURE 6C.

In addition to the electrical symmetry shown in FIGURES 6A, 6B, and 6C, it is important to have a coupling coefficient $k$ which is exactly, or very nearly, equal to the critical coefficient of coupling $k_c$. This produces the maximum possible voltage $e_b$ across the capacitors 45 and 46, which voltage is related to the voltage $e'$ in series with the primary by the following expression, derived from page 156 of the Radio Engineer's Handbook:

(6) $$\frac{e_b}{e'} = \frac{Q}{2} = \frac{1}{2k_c}$$

Also, this critical coupling produces the desirable broadened flat-topped curve which is characteristic of the response in the secondary circuit of critically coupled resonant circuits. Thus, the system is not sensitive to changes in the frequency of the carrier signal over a range of $\pm 4\%$.

In order to explain the operation, assume that the observed condition 1 now causes a small differential change $\delta c$ to occur in the two air-gap capacitors, so that one of them becomes $2C_1 + \delta c$ and the other becomes $2C_1 - \delta c$. A voltage difference $e_s$ now develops across the points "$a$" and "$b$."

In this example, $\delta c$ is the instantaneous value of the incremental change in capacitance which is assumed to vary sinusoidally with time. The value of the small voltage difference $e_s$, as appears from FIGURE 6C, is:

(7) $$e_s = e_b \frac{\delta c}{4C_1}$$

and this signal $e_s$ is applied to the primary 55 of the signal transformer 54, as shown in FIGURES 2 and 5 connected to points $a$ and $b$.

In the circuit diagram of FIGURE 7A, this voltage $e_s$ is shown as being delivered from a generator having zero internal impedance connected in series with the two sides of the bridge 2, which are in parallel.

FIGURE 7B shows a symmetrical double-tuned circuit which is the electrical equivalent of that shown in FIGURE 7A, assuming that the losses in the link coupling 5 are small. This conversion is analogous to that made in going from FIGURES 6B to 6C. The requirement for electrical symmetry exists for the signal output transformer 54 and for the receiver transformer 128 and the link coupling 5 therebetween, as was true of the bridge input circuit shown in FIGURE 6A. Also, for optimum performance, it is preferred that the coefficient of coupling $k$ be equal to the critical coefficient $k_c$.

Then, the voltage $e_r$ in FIGURE 7B across the secondary of the receiver transformer is derived from Terman, page 156, as above, and is:

(8) $$e_r = \frac{e_s A}{2k_c} = \frac{AQ}{2} e_s$$

where $A$ is a linear coefficient of amplitude.

Substituting from Equation 7, this expression becomes:

(9) $$e_r = \frac{AQ\delta c}{8C_1} e_b$$

When the bridge circuit 2 is initially balanced, and the incremental differential changes in the two capacitive arms of the bridge are introduced sinusoidally and are equal and symmetrical about the initial balance point, then the instantaneous incremental change in capacitance is expressed:

(10) $$\delta c = \Delta C \cos \omega_m t$$

where $\Delta C$ is the maximum value of the change in capacitance, and $\omega_m$ is the angular frequency of the change in capacitance.

The voltage $e_r$ across the secondary of the signal receiver transformer 128 is thus seen to have the following value, as derived from Equations 9 and 10:

(11) $$e_r = \frac{AQ\Delta C}{8C_1} E_b \cos \omega_c t \cos \omega_m t = A_m \cos \omega_c t \cos \omega_m t$$

where $E_b$ is the maximum value of the bridge driving voltage, $\cos \omega_c t$ is the angular frequency of the carrier or bridge driving voltage, and $A_m$ is a linear coefficient of amplitude for the modulated signal.

This receiver voltage $e_r$ is amplified by the signal amplifier 6 and is impressed as a balanced push-pull voltage upon the terminals $X_1$ and $X_2$ of the phase and amplitude sensitive discriminator circuit 12.

Under the conditions described, the receiver voltage $e_r$ has the form shown in FIGURE 10. It is noted that voltage of the carrier frequency and of the modulating frequency are completely absent, and there are two equi-amplitude voltages of side-band frequencies present. These side-band frequencies are symmetrically spaced on a linear frequency spectrum by an amount $\omega_m$ on either side of the angular carrier frequency $\omega_c$. This can also be seen by manipulation of Equation 11 in accordance with the trigonometric relationship:

(12) $$S \cos P \cos Q = \frac{S}{2}[\cos(P+Q) + \cos(P-Q)]$$

Accordingly, Equation 11 can be rewritten:

(13) $$e_r = \frac{AQ\Delta CE_b}{16}[\cos(\omega_c+\omega_m)t + \cos(\omega_c-\omega_m)t]$$

As a result of these advantageous relationships, the signal amplifier 6 is required to amplify only a relatively narrow band of frequencies, namely twice the over-all frequency response, centered about the carrier frequency of 456 kc.

*Detailed Description of Signal Amplifier Circuit 6*

As seen in FIGURE 2, the signal amplifier 6 includes a pentode 135 in its first stage having a plate supply decoupling resistor 136 and filter capacitor 138, with a cathode resistor 139. The screen voltage is provided by the dropping resistors 140 and 141 and the filter capacitor 142. The amplified signal voltage appearing across the anode resistor 143 is fed through a coupling capacitor 144 to a potentiometer 145 having its adjustable contact 146 connected through a grid resistor 147 to the grid of a pentode 148 in the second stage. This second stage is identical to the first and circuit components performing functions corresponding to the first stage have corresponding reference numbers.

From the output coupling capacitor 144 of the second stage the amplified signal is applied across a resistor 149 to the grid of a pentode 150 in a tuned push-pull amplifier including a companion pentode 151. The two sides of this push-pull amplifier are identical except for a minor difference which improves the balance of the output voltages on the two leads 9 and 10 to the phase and amplitude sensitive discriminator and demodulator 12. There is a capacitor 153 shunting the resistor 149 which is connected to the grid of the other pentode 151. Each tube has a cathode bias resistor 163 shunted by a bypass capacitor 154 and connected to the common return circuit through a parallel tuned circuit 155 and 156, which is resonant to the carrier frequency. The anode voltage is supplied from the source B+ through a series resistor 157 and across a filter capacitor 158 to the center tap of the primary 159 of the output transformer 160. The screen grid voltage is supplied from B+ through a filter resistor 161 and past a filter capacitor 162 and through a parallel resonant circuit 152 which is tuned to the carrier frequency. The anodes of the tubes 150 and 151 are connected to opposite sides of the primary 159 which has a self inductance of $L_3$ and is resonant at the carrier frequency with a capacitor 190 having a capacitance value of $C_3$. From the opposite sides of the secondary 191, having a grounded center tap 192, a balanced push-pull signal voltage is fed through the leads 9 and 10 to the $X_1$ and $X_2$ terminals of the phase and amplitude sensitive discriminator 12.

*Injection Amplifier Circuit 14*

As seen in FIGURE 2, the injection amplifier circuit 14 is generally similar to the final stage of the signal amplifier circuit. The secondary 134 is connected across an adjustable phase balance circuit comprising a fixed capacitor 164 shunted by an adjustable capacitor 165. One side of these capacitors is connected to the grid of a pentode 166 in a tuned push-pull amplification stage including a companion pentode 168 which has its grid connected to the opposite side of the capacitors. Each tube 166 and 168 has a cathode bias resistor 170 shunted by a capacitor 171 and connected to the return circuit 71 through a tuned parallel circuit which is resonant at the carrier frequency and comprises an inductor 172 and a capacitor 173. The anodes are energized from B+ through a resistor 174 connected to a filter capacitor 175 and connected to a center tap on the primary 176 of the output transformer 177. The screen grid energizing circuit has a resistor 178 and a filter capacitor 179 connected to a tuned circuit 180 which is resonant at the carrier frequency. A capacitor 181 is connected across the primary 176 and is resonant therewith at the carrier frequency. The amplified carrier signal is fed in balanced push-pull relationship from the secondary 182 through the leads 15 and 16 to the respective $Y_1$ and $Y_2$ terminals of the discriminator 12. This secondary has a grounded center connection 193.

*Features of Operation of the Phase and Amplitude Sensitive Discriminator Circuit 12*

In order to explain the operation of the phase and amplitude discriminator circuit 12, it is convenient to consider the circuit 12 as including three interconnected networks, as illustrated in FIGURES 2, 8, and 8A. There is a resonant capacitance network loop 200 comprising eight identical capacitors 201 through 208, which includes the pair of signal input terminals $X_1$ and $X_2$ and the pair of reference input terminals $Y_1$ and $Y_2$. These eight capacitors are in series with one another around the loop, as seen in FIGURE 2, and there are two of them in series between each of the four input terminals in succession around the loop. In FIGURE 8A, this capacitance loop 200 is redrawn separately and arranged with the $X_1$ and $X_2$ terminals at the top and the $Y_1$ and $Y_2$ terminals at the bottom, which is convenient for purposes of illustrating the operation.

The second network, within the phase and amplitude sensitive discriminator 12, as seen most clearly in FIGURE 8, is a rectifier network or diode matrix 210 including eight rectifiers 211 through 218, inclusive, and co-operating with the capacitance network to form four half-wave voltage-doubling circuits. These rectifiers are advantageously arranged to provide a reference each half cycle to the reference point G and the lead 17, which is indicated as the D.C. reference lead. The rectifier network 210 has four input terminals A, B, C, and D respectively which are connected to the capacitance loop 200 at the points A, B, C, and D, and there are two output terminals E and F from the rectifier network.

The third network within the circuit 12 is a four-legged resistance bridge 220 including the identical resistors 221, 222, 223, and 224. This resistance bridge effectively compares the D.-C. voltage at point E with the D.-C. voltage at point F and provides an output voltage on the terminal lead 19 which is proportional to the difference between the voltages at E and F. A capacitor 225 extends diagonally across the bridge and provides smoothing for the output voltage on the lead 19.

Figure 9A:
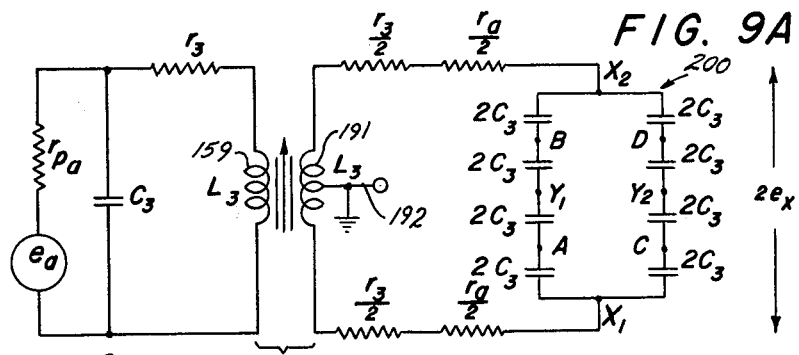
Figure 9B:
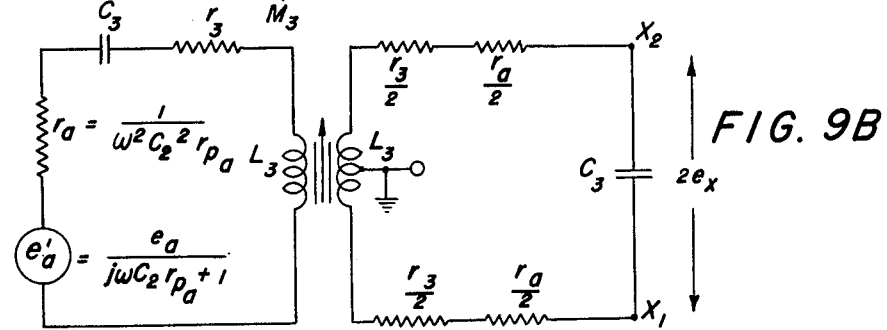

Before considering further aspects of the operation of the discriminator circuit 12, attention is directed to FIGURES 9A and 9B, which are schematic circuit diagrams illustrating the desirable resonance between the output stage of the signal amplifier 6 and the capacitor loop 200. In FIGURE 9A, the signal amplifier tubes 146 and 148 are represented as an equivalent single-sided amplifier for reasons of simplifying the illustration, and this single-sided amplifier is shown symbolically as a generator with zero internal impedance delivering a voltage $e_a$ and having a resistor $r_{p_a}$ in series therewith as caused by the dynamic plate resistance of these tubes. The capacitance $C_3$ represents the effect of the plate capacitance of the tubes 146 and 148 and the capacitor 190 in the anode circuit, and $r_3$ represents the dissipation in the anode circuits. The self-inductance of the primary 159 has a value of $L_3$, resonant with $C_3$, and the secondary 191 also has a self-inductance value of $L_3$, with a mutual inductance of $M_3$ therebetween. The two resistors $$\frac{r_3}{2}$$

represent the dissipation in the two halves of the secondary, and the two resistors $$\frac{r_a}{2}$$

are the effective resistances coupled into the secondary caused by the dynamic plate resistance $r_{p_a}$. The eight capacitors 201–208 each has a capacitance value of $2C_3$.

FIGURE 9B is precisely equivalent to FIGURE 9A. It will be appreciated that the eight capacitances of value $2C_3$ in the capacitance network 200 are effectively in a series parallel relationship between the input terminals $X_1$ and $X_2$. Thus, advantageously, the capacitance loop 200 provides an overall effective capacitance value of $C_3$ between the points $X_1$ and $X_2$, which is the proper value to resonate with the output stage of the signal amplifier.

It is convenient to consider the signal voltage applied across the terminals $X_1$ and $X_2$ as having a value of $2e_x$, as is also indicated in FIGURE 8A.

Figure 9C:
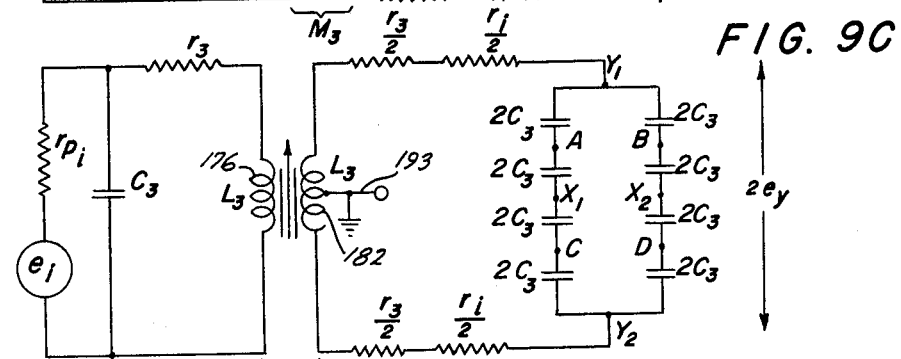
Figure 9D:
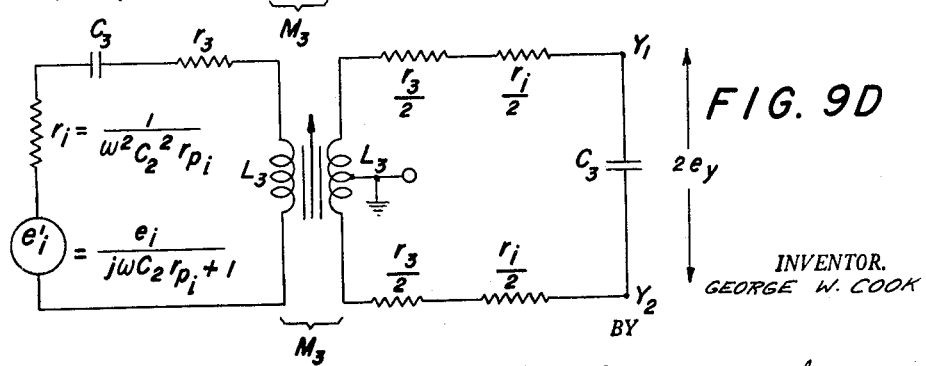

Similar considerations to these apply to the schematic circuit diagrams of FIGURES 9C and 9D which represent the interaction of the output of the injection amplifier 14 and the circuit 12. Consequently, the capacitor loop 200 is also resonant with the output stage of the injection amplifier 14. As a result of these advantageous interactions, the discriminator circuit 12 requires very little energization compared with the magnitude of the output obtained. The only energization required from the amplifier circuits 6 and 14 is that necessary to maintain oscillations in the capacitor loop 200. It is also convenient to consider the injected carrier signal voltage across the terminals $Y_1$ and $Y_2$ as having a value $2e_y$, as is also indicated in FIGURE 8A.

In operation, as shown in FIGURE 8A, the signal amplifier output voltage $2e_x$ acts between the terminals $X_1$ and $X_2$. During one-half cycle the terminal $X_1$ is at a voltage of $e_x$, and the other at $-e_x$. The four capacitors in series 201, 202, 203, and 204 act like a voltage divider so that the points A and B tend to be at $$\frac{+e_x}{2}$$

and $$\frac{-e_x}{2}$$

respectively. Similarly, the four capacitors 208, 207, 206, and 205 form a second voltage divider so that the points C and D tend to be at $$\frac{+e_x}{2}$$

and $$\frac{-e_x}{2}$$

respectively. With respect to the $X_1$ and $X_2$ terminals, both the $Y_1$ and $Y_2$ terminals tend to be balance points. This relationship is also seen clearly from FIGURE 8, wherein the capacitance loop is opened at the $X_1$ and $X_2$ terminals to provide the convenient configuration as illustrated therein.

Additionally, with an injection reference voltage of $+e_y$ and $-e_y$ applied to the terminals $Y_1$ and $Y_2$, the points A and B each tend to be at a voltage of $$\frac{+e_y}{2}$$

and C and D each tend to be at a voltage of $$\frac{-e_y}{2}$$

Accordingly, the signal and carrier voltages are additive at points A and D and are in opposition at the points B and C. When the relative phase of the signal voltage is reversed with respect to the carrier signal, then the respective effects are reversed.

When the terminal $X_1$ is positive with respect to $X_2$, then current flows from $X_1$ (upper left in FIGURE 8) down through the capacitor 201 as displacement current to point A, through the diode rectifier 211 to point E, and down through the resistor 221 to the reference point G which is connected to the lead 17. Current flows from the point G down through the resistor 224 to the point F and through the diode rectifier 216 to the point B and as displacement current through the capacitor 204 to the terminal $X_2$ (lower left). Thus, during this half cycle when $X_1$ is positive and $X_2$ is negative, the point E tends to become positive with respect to F.

Assuming that the system has been in operation for several cycles of the carrier signal, then the rectification by the diode rectifiers will have built up charges on the capacitors as shown. The way in which these charges are obtained will be explained further on, but it is noted that these charges provide a desirable voltage-doubling effect.

During this half-cycle of the signal voltage when the terminal $X_1$ is positive with respect to $X_2$, attention is also directed to the lower right terminal $X_1$ in FIGURE 8. It will be noted that current flows upwardly through the capacitor 208 to the point C, which is effectively tied to the reference point G by the rectifier 214. Thus, the capacitor 208 is receiving a charge with polarity as shown. Similarly, the point D is effectively tied to the reference point G by the rectifier 213, and so the capacitor 205 also receives a charge of polarity as shown.

When the second half-cycle of the signal voltage is occurring, the applied voltages are all reversed from those shown in FIGURE 8. Then the charges which were established on the capacitors 208 and 205 act in series aiding relationship with the applied voltage so as to provide a voltage doubling effect. Current flows from the upper right terminal $X_2$ (now positive) as a displacement current down through the capacitor 205, through the rectifier 212, and down through the resistor 221 from point E to the reference point G. From G, current flows down through the resistor 224 and continues on through the rectifier 215 and the capacitor 208 to the terminal $X_1$ (lower right). Thus, the point E remains positive with respect to the point F.

During this second half-cycle, the points A and B are effectively tied to the reference point G by the rectifiers 218 and 217, respectively, and so the capacitors 201 and 204 receive a charge, as was indicated above.

There is no output signal on the lead 19 in the absence of the carrier reference voltage, for the bridge 220 has four equal resistance arms, and the positive voltage at E exactly offsets the negative voltage at F.

From the above discussion, it will be understood that when the carrier injection voltage is applied with phase relationships such that the terminal $Y_1$ is positive with respect to $Y_2$, then the capacitors 202, 203, 207, and 206 become charged as shown and provide desirable voltage doubling action. When $Y_1$ is positive, then B and D are tied to the reference point G by the rectifiers 217 and 213, respectively. During the subsequent half cycle, the points A and C are referenced to G through the rectifiers 218 and 214, respectively.

When the relative phase of the signal voltage $e_x$ has the relationship to the carrier voltage $e_y$ as shown, then the signal and carrier voltages are additive at the points A and D and oppose each other at the points B and C. As a result, the magnitude of the positive voltage at the terminal E becomes larger than the magnitude of the negative voltage at the point F. The output sensing bridge 220 becomes unbalanced and provides a positive D.-C. output voltage on the lead 19 which is proportional to the extent of the unbalance of the condition-sensing bridge 2.

When the capacitance bridge 2 is unbalanced in the opposite direction, then the phase of the signal voltage reverses with respect to the carrier voltage, and the D.-C. output signal on the lead 19 becomes negative and proportional to the unbalance of the capacitance bridge 2.

It is desired to direct attention to several advantages of this system. The modulation of the carrier by the biresonant capacitance bridge 2 is accomplished by the addition of the carrier and two symmetrical sideband components. The carrier is suppressed when the bridge initially balanced so that the resultant output includes only the two symmetrical sideband components, as shown in FIGURE 10 and in Equation 13. A voltage of the angular modulating frequency $\omega_m$ is not used in the process and conventional tuned circuits and other non-linear circuit elements are avoided.

In the discriminator at the respective points A, B, C, and D, four modulated carrier voltages are present and also four injected carrier voltages are present. The rectification of these four modulated carrier waves which are paired in push-pull (contra-phase) relationship, results in direct cancellation of even-harmonic distortion of the component of angular modulating frequency $\omega_m$. The result of this action is the accomplishment of distortionless operation and linear response, insofar as the frequency of the condition 1 under observation is concerned.

*Output Stage and Utilization Circuits*

The direct current output signal on the lead 19 is fed to the grid of the left section of a dual triode 230, with its cathode connected through a resistor 232 to a microammeter 234. This is a center-zero type meter, and its other terminal is connected to the cathode of the right triode section. Both cathodes are connected through identical resistors 235 and 236, respectively, to the B− voltage source.

In order to provide a D.-C. reference voltage source, a voltage dropping resistor 238 is connected from the B− source to a pair of identical potentiometers 239 and 240, and the other sides of these potentiometers are connected to the common return or "ground" circuit. The lead 17 is connected to the adjustable contact of the potentiometer 239, for adjusting the D.-C. reference voltage, and a bypass capacitor 242 is connected from lead 17 to ground.

For adjusting the position of the pointer of the meter 234 in the absence of any output voltage, the grid of the second triode section is connected to the contact of the potentiometer 240.

A suitable utilization circuit, such as a measurement recording and control device 20 is connected by the lead 21 to the cathode of the first triode section.

*Null Indicator and Meter Circuits*

In order to facilitate the balancing of the sensing bridge 2 and to show the carrier level, the null indicator and meter circuits 8 are provided. The amplitude of the carrier is indicated by a meter 250, as shown in FIGURE 2.

The carrier signal is fed by the lead 25 to the grid of a triode amplifier stage 252, which includes a grid return resistor 253, a cathode resistor 254, by-pass capacitor 255, and an anode load resistor 256. The negative-going excursions of the carrier signal appearing at the anode of the tube 252 are rectified by a diode 257, creating a charge of the polarity as shown on a capacitor 258. The gas tube 259 is included to protect the diodes 257 and 260 against transient surges. The positive-going excursions of the amplified carrier signal are fed through a rectifier 260 and a series resistor 261 to the meter 250.

For indicating the null condition of the bridge 2, a reflex double amplifier circuit 262 is used. That is, the voltage gain of a pentode 264 is used as the carrier frequency, and at the same time it serves as a D.-C. amplifier for the metering circuit including the meter 265. This meter circuit is designed so that the meter scale is approximately logarithmic on an inverse scale.

The amplified signal from the sensing bridge 2 is fed from an intermediate point in the signal amplifier 6 (please see FIGURE 2) through a resistor 269 and an OFF-READ switch 270 and through the lead 7 and a coupling capacitor 271 to the grid of the pentode 264.

The parallel resonant circuit 271' and 272 enhances the gain of the pentode at carrier frequency and reduces the A.-C. gain at sub-harmonic and upper-harmonic frequencies. This same resonant circuit serves to block the amplified carrier current from the metering circuit. The cathode follower stage 274 is employed as a low-impedance reference point for the positive terminal of the meter 265. The negative terminal of this meter connects to the anode of the pentode 264 through the low D.-C. resistance path provided by the inductor 271'. Any carrier current which happens to pass through the tuned circuit 271', 272 is by-passed to ground by the capacitor 276.

The metering circuit operates as a low-resistance voltmeter that indicates the average D.-C. anode potential of the pentode 264 referred to the potential level of the cathode of the cathode-follower stage 274. The left section of the duo-diode 278 is shunted by a resistor 277 and is coupled to the anode of the pentode 264 by a capacitor 279. This left diode section serves as a half-wave rectifier for carrier frequency, imposing the average D.-C. component of the rectified carrier voltage on the grid of the pentode via the resistances 281 and 282 that constitute the grid return path. Ripple voltages are by-passed to ground by a capacitor 280. Thus, the pentode acts to reduce its own gain as the signal increases, and vice versa.

The right section of the duo-diode 278 acts as an overload shunt for the meter 265 for large signal voltages. When the bridge is balanced and no carrier voltage is imposed on the pentode grid by the signal amplifier, the current in the right diode section that shunts the meter is cut off by reversal of the voltage across it and the meter reads full scale, with no effective shunt. The sensitivity is very high and bridge balance may be accomplished to a high degree of precision. When the bridge is unbalanced and large voltages appear at the input to the null indicator, the current in the pentode is reduced and the voltage across the diode and meter tends to reverse polarity; and in so doing approaches zero. The conductivity and resultant low resistance of the diode is now in parallel with the meter and its series resistor. The sensitivity of the meter is greatly reduced since the diode is conducting a large share of the available current.

Simultaneously, the mutual conductance of the pentode is reduced because of the increased biasing voltage developed on its control grid by the rectified carrier voltage. As a result the anode current approaches zero. The current in the pentode cannot be cut off entirely, however, because the biasing voltage tending to cut it off is obtained from the rectified signal at its own anode. The combination of the reduction in mutual conductance and gain of the tube, and the shunting of the meter by the diode, provides a convenient near-logarithmic characteristic. When the bridge is unbalanced a large amount, any improvement in balance is readily seen; and at the same time the circuit does not overload or saturate. The adjustable potentiometer 284 provides a convenient means for adjusting the average biasing voltage and the resultant average anode potential level of the pentode. This is done so that with no signal voltage to the null-indicator circuit, the meter reads exactly full scale.

*Capacitance Bridge Balancing Method and Circuits*

For purposes of balancing the biresonant capacitance sensing bridge 2, the capacitor 45 is shunted by a very small adjustable capacitor 290 in series with a very small fixed capacitor 291 connected in circuit between the bridge terminals $b$ and $m$, with the adjustable capacitor 290 being adjacent to the grounded point $b$. Similarly an adjustable capacitor 294 in series with a fixed capacitor 295 is connected across the bridge capacitor 46 between the terminals $b$ and $n$. Because of the small capacitance of each pair of these capacitors in series, a very small effective change in capacitance as desired can be obtained by adjustment for precisely balancing the bridge.

*Remote Balancing Method and Circuits*

The capacitance bridge 2 may be balanced at some physical distance by means of a cable 308, as shown in FIGURE 2 extending to a remote balancing circuit 310. A capacitor 312 is connected in series with the cable 308 at the bridge, and at the other end of the cable an adjustable resistor 313 is connected in series with an adjustable capacitor 314 and a decade capacitance unit as indicated by the capacitances at 315. By adjustment of first the adjustable resistance and then the variable capacitors 314 and 315 the bridge 2 is balanced. The resistance 313 balances the effective dissipation currents, and the capacitances 314 and 315 balance the capacitive arms of the bridge.

*Calibration Method and Circuit*

In order to calibrate the bi-resonant capacitance sensing bridge 2, the calibration circuit 300 is provided shunting the capacitance arm 45 of the bridge 2. This calibration circuit includes a first relatively larger capacitor 304 shunted by a switch 302 in series with a second relatively smaller capacitor 305. The capacitance of the second capacitor 305 is relatively very small, and thus opening and closing the switch 302 causes a very small capacitance change between the points $m$ and $b$.

When the switch 302 is open, the total capacitance between the points $m$ and $b$ includes the capacitor 304 ($C_4$) and the capacitor 305 ($C_5$) in series, which provide the effective capacitance:

$$(14) \qquad C_4 \text{ in series with } C_5 = \frac{C_4 C_5}{C_4 + C_5}$$

When this switch is closed, then only $C_5$ is present. The difference $\Delta C$ is expressed $$(15) \qquad \Delta C = C_5 - \frac{C_4 C_5}{C_4 + C_5} = \frac{C_5^2}{C_4 + C_5}$$

In this example $C_4$ is 5,600 micromicrofarads and $C_5$ is 10 micromicrofarads. Thus, the change in capacitance $\Delta C$ is slightly less than 0.02 micromicrofarad, which is a very small change suitable for calibrating this sensitive circuit.

Consequently, the sensitivity of the entire measurement system can conveniently be spot-checked at any time by simply opening the calibrating switch 302. The stray capacitance of the switch arm to ground is negligible by comparison with the large capacitance of $C_4$ and thus does not introduce any significant error. Any excursion of the bridge from balance which is produced by the measurement of an unknown quantity may be directly compared with the excursion produced by opening and closing of the calibration switch.

In many cases it may be desired to have the calibration circuit 300 remote from the bridge 2. Then a high quality coaxial cable 306 is used of any convenient length, and the capacitance $C_4$ actually includes the capacitance of the capacitor 304 plus the shunt cable capacitance. The reason for the use of a high quality cable 306 is to maintain the shunt cable capacitance constant.

Example of Suitable Components

An illustrative example of suitable components for this system is set forth below.

Vacuum tubes:

| | Type |
|---|---|
| 68 | 12AX7 |
| 88, 252 | 12AT7 |
| 230 | 12AU7 |
| 274 | 6C4 |
| 278 | 6AL5 |
| 107 and 108 | 6BH6 |
| 135, 148, 150, 151, 166, 168, and 264 | 6AK6 |
| All diode rectifiers | IN458 |

Capacitors:

| | Capacitance (in micromicrofarads unless noted) |
|---|---|
| 45, 46 | Approx. 65. |
| 78 | 130. |
| 80 | 0.002 mf. |
| 83 | 200. |
| 97 | 5. |
| 101, 102 | 270. |
| 103, 104 | 1–11. |
| 102 | 6. |
| 122 | 24. |
| 130 | 130. |
| 144, 153, 154, 171 | .01 mf. |
| 156, 152, 162, 173, 180 | 120. |
| 164 | 124. |
| 165 | 0–50. |
| 201–208 | 260. |
| 279 | .001 mf. |
| 290, 294 | 1–11. |
| 291, 295 | 1. |
| 258 | .01 mf. |
| 242, 271, 304 | .0056 mf. |
| 305, 312 | 10. |
| 314 | 0–140. |
| 315 | Two decades .001 mf. to .011 mf. |

Inductors:

| | Inductance (in millihenries unless noted) |
|---|---|
| 77, 271 | 1.175 |
| 155, 157, 161, 172, 174, 178 | 1 |

Resistors:

| | Resistance (in megohms unless noted) |
|---|---|
| 69 | 2.2K |
| 72 | .1 |
| 73 | .39 |
| 74 | 4.7K |
| 81 | .22 |
| 84 | .27 |
| 85 | 5K |
| 90 | 1.5K |
| 99, 221–224 | .47 |
| 120, 139 | ohms 200 |
| 111 | 8.2K |
| 119 | 20K |
| 121 | .12 |
| 136, 145, 239, 240 | 10K |
| 140 | .1 |
| 141 | .15 |
| 147, 254, 313 | 1K |
| 152 | ohms 220 |
| 153, 170 | do 560 |
| 157, 174 | 6.8K |
| 161, 178 | 39K |
| 235, 236, 238, 256 | 27K |
| 261 | 22K |
| 277, 281, 282 | 1 |
| 284 | ohms 500 |

From the foregoing it will be understood that the measurement system described above as an illustrative embodiment of the present inventoin is well suited to provide the many advantages set forth, and since many possible embodiments may be made of the various features of this invention and as the measurement system herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. A phase and amplitude sensitive discriminator circuit having first and second signal input terminals and first and second reference input terminals, eight equal capacitors connected in series in a loop, a first pair of said capacitors being connected from said first signal input terminal to said first reference input terminal, a second pair of said capacitors being connected from said first reference input terminal to said second signal input terminal, a third pair of said capacitors being connected from said second signal input terminal to said second reference input terminal, and the fourth pair of said capacitors being connected from said second reference input terminal back to said first signal input terminal, a rectifier matrix connected to the four mid points between each of said four pairs of capacitors, and a smoothing capacitance connected to the output of said rectifier matrix.

2. A phase and amplitude sensitive discriminator circuit having first and second signal input terminals and first and second reference input terminals, eight equal capacitors connected in series in a loop, a first pair of said capacitors being connected from said first signal input terminal to said first reference input terminal, a second pair of said capacitors being connected from said first reference input terminal to said second signal input terminal, a third pair of said capacitors being connected from said second signal input terminal to said second reference input terminal, and the fourth pair of said capacitors being connected from said second reference input terminal back to said first signal input terminal, a rectifier matrix connected to the four mid points between each of said four pairs of capacitors, a four arm resistance bridge of four equal resistance means having its diagonally opposite corners connected to two opposite points in said matrix, an output circuit connected to the third and fourth corners of said bridge, and smoothing capacitance means in said output circuit.

3. A phase and amplitude sensitive discriminator circuit having first and second signal input terminals and first and second reference input terminals, eight equal capacitors connected in series in a loop, a first pair of said capacitors being connected from said first signal input terminal to said first reference input terminal, a second pair of said capacitors being connected from said first reference input terminal to said second signal input terminal, a third pair of said capacitors being connected from said second signal input terminal to said second reference input terminal, and the fourth pair of said capacitors being connected from said second reference input terminal back to said first signal input terminal, a rectifier matrix connected to the four mid points between each of said four pairs of capacitors, said matrix including eight rectifier elements connected in a loop, a pair of said rectifier elements being in series between each of said four mid points, and output circuit means connected to the junction points of each of said four pairs of rectifier elements.

4. A phase and amplitude sensitive discriminator circuit as claimed in claim 3 and wherein said output circuit means includes a four-arm resistance bridge having equal resistance means in each arm.

5. A phase and amplitude sensitive discriminator circuit having first and second signal input terminals and first and second reference input terminals, eight equal capacitors connected in series in a loop, a first pair of said capacitors having a junction point A therebetween and being connected from said first signal input terminal to said first reference input terminal, a second pair of said capacitors having a junction point B therebetween and being connected from said first reference input terminal to said second signal input terminal, a third pair of said capacitors having a junction point D therebetween and being connected from said second signal input terminal to said second reference input terminal, and the fourth pair of said capacitors having a junction point C therebetween and being connected from said second reference input terminal back to said first signal input terminal, a rectifier matrix connected to said four points A, B, C, and D between each of said four pairs of capacitors, said rectifier matrix including eight rectifier elements, a first pair thereof being connected in the forward direction from B to A, a second pair thereof being in the forward direction from C to D, the junction points between said first and second pair of rectifier elements being conductively connected and forming a first output terminal G, a third pair thereof connected in the forward direction from A and from D, respectively, to a junction point E, and a fourth pair connected in the forward direction from a junction point F to B and to C, respectively, and a four-equal-arm resistance bridge having three successive adjacent corners connected to E, G and F, respectively, and a second output terminal at the fourth corner of said bridge.

6. A phase and amplitude sensitive discriminator as claimed in claim 5 having first inductive circuit means connected between said first and second signal input terminals and being resonant with said four pairs of capacitors at the operating frequency and having second inductive circuit means connected between said first and second reference input terminals and also being resonant with said four pairs of capacitors at the operating frequency.

References Cited in the file of this patent

UNITED STATES PATENTS

| | | |
|---|---|---|
| 2,691,132 | Sherwood et al. | Oct. 5, 1954 |
| 2,940,042 | Fisher | June 7, 1960 |

FOREIGN PATENTS

| | | |
|---|---|---|
| 961,339 | France | Nov. 21, 1949 |
| 554,661 | Germany | July 12, 1932 |
| 303,198 | Germany | Jan. 26, 1918 |
| 862,626 | Germany | Jan. 12, 1953 |